Sept. 9, 1969          M. SZWARCMAN          3,465,481
METHOD FOR MACHINING A GAS PERMEABLE MATERIAL
Filed July 6, 1966
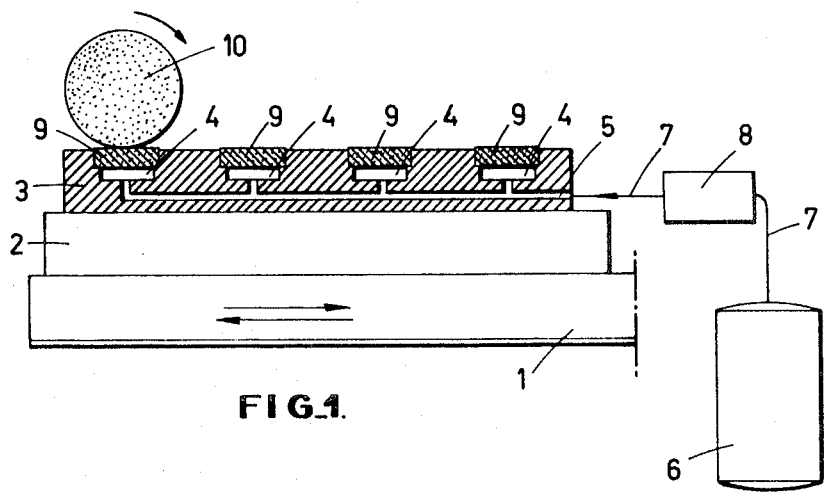
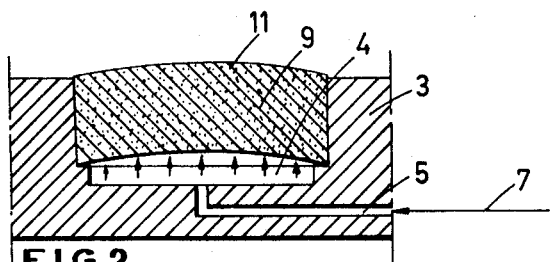
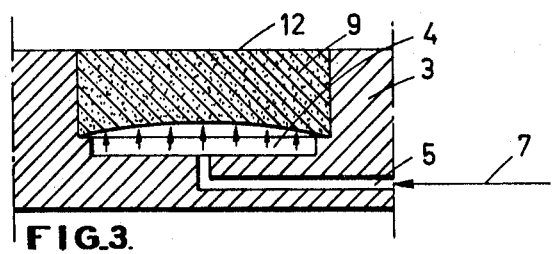
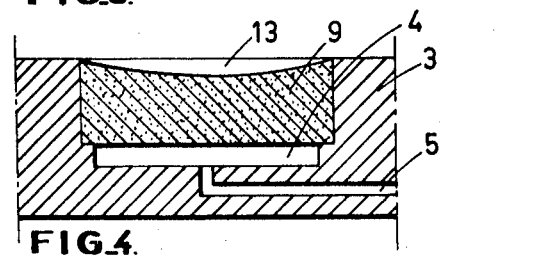
INVENTOR
MIECZSLAW SZWARCMAN
BY
*Stevens, Davis, Miller & Mosher*
ATTORNEYS United States Patent Office 3,465,481
Patented Sept. 9, 1969

3,465,481
METHOD FOR MACHINING A GAS
PERMEABLE MATERIAL
Mieczyslaw Szwarcman, 61 Ave. de l'Emeraude,
Brussels 4, Belgium
Filed July 6, 1966, Ser. No. 563,116
Claims priority, application Belgium, July 6, 1965,
666,463
Int. Cl. B24b 1/00
U.S. Cl. 51—324                    4 Claims

ABSTRACT OF THE DISCLOSURE

A method for machining at least one gas permeable element including a housing in which said element is mounted and subjected to pressurized gas and means to machine the element downstream of the gas flow simultaneously with the passage therethrough of gas under pressure.

---

The present invention relates to a method for machining a component comprising one or more elements of a material permeable to a pressurized gas.

For the purposes of this application, it is to be understood that the term "a material permeable to a pressurized gas" refers to a porous material, or a material provided with a plurality of minute channels, such as capillary channels, which are not interconnected; it is also to be understood, that the term "machining" refers to any machining method by removal of material, such as grinding, milling, etc.

Machining the faces of these type elements proves difficult when the element or elements, after machining, must let pass a specific flow of pressurized gas, in view of the fact that the machining modifies the surface structure of the porous element by plugging and sealing the pores or the channels through which passes the gas. The permeability of the element is therefore considerably reduced and may even be completely eliminated.

The object of the present invention is to overcome this difficulty. For that purpose, in the present invention, pressurized gas is passed through the permeable element simultaneously with the machining operation.

The method according to the invention will be advantageously applied to the machining of the heterogeneous face of a component having a nonpermeable material enclosing one or more element sof a material permeable to a pressurized gas. These types components have many general uses, such as in a machine-tool or the like, in which the component is adapted to slide with respect to a second component, a gas lubrication being established between the two components by passing a pressurized gas from an external source, through the permeable material, and into a space between the two components.

In this type of slide assembly, the evenness of each element of the slide has to be as perfect as possible, because of the very critical dimensions of the gas permeable material, which calls for a very carefuly machining operation.

In accordance with the present invention, the element permeable to the pressurized gas is placed within a housing of nonpermeable material and is caused to bulge under the effect of the pressurized gas due to its elasticity, so that its outer face extends outward from the nonpermeable material in which it is housed. The outer face of the element is then machined until it is flush with the housing material. When the supply of pressurized gas is subsequently cut off, the outer face will be of a slightly curved shape, and will extend within the housing member. This affords the advantage that, at rest, in the absence of pressurized gas, the element permeable to the pressurized gas is not in contacting relationship with an external component, such as the member on which the slidable component moves, so that a deterioration of the elements is prevented.

In addition, the application of the air pressure to the permeable element in the course of machining eliminates a gradual plugging at the surface of the passage or pores of the element and the resulting sealing thereof.

According to an embodiment of the invention, the flow of pressurized gas is measured and machining is stopped substantially at the moment the flow of pressurized gas through the element corresponds to the desired coefficient of permeability.

According to the invention, it is of advantage to select elements having, before machining, a greater permeability than that needed after machining in order to compensate for the clogging of the passages or pores arising in the course of machining.

Other details and features of the present invention will become apparent from the description given hereafter of nonlimitative character of a form of embodiment of the invention with reference to the drawings, wherein:

FIG. 1 is a schematic illustration, partly in section, of an installation allowing the working of the method according to the invention, in the case where the machining considered is a grinding operation.

FIGS. 2, 3 and 4 are diagrammatic sectional views of a portion of a component with a porous element during and after grinding.

In the different figures, the same reference numerals refer to the same elements.

The installation shown comprises a table 1 of a grinder, on which is mounted a magnetic plate 2 carrying a component 3 to be ground. The component 3 includes a nonpermeable metallic housing in which are provided recesses 4 connected at their bottoms to a feed channel 5 to which is supplied pressurized air from a compressor 6 through a supply line 7, a flow meter 8 being provided between the compressor and the channel 5. In each recess 4 is provided, at a certain distance from the bottom thereof, an inset 9 of porous material secured on its circumference to the side wall of recess 4. The grinding wheel of the grinder bears the reference numeral 10.

When pressurized air is admitted to the recesses 4, the insets 9 will be elastically distorted taking on a camber 11 which is removed by the grinding wheel. During grinding it should be ensured that the air pressure is equal to or slightly in excess of the working pressure. The insets are ground until they present a face flush with the surface of the housing portion of component 1, while they are still under the force of the air pressure.

When the pressurized air supply is cut off, the elastic strain draws the plane face 12 inwards, so that a slight recess 13 is formed. In this position when component 1, which may be, for example, the carriage of a machine-tool, is carried on an external component, for example, the slide of the machine-tool, the insets 9 do not carry the weight of the component 1. Therefore, the pores of the insets 9 will not collapse and therefore not be sealed.

It is well understood that the invention is not limited to the described form of embodiment and that many changes may be introduced therein without departing from the spirit of the present invention.

Thus the method may be used for machining the face of one or more independent elements, all of which are made from a material permeable to a pressurized gas, these elements being set for machining inside a frame not permeable to the pressurized gas.

I claim:
1. A method of machining a surface of a workpiece made of homogeneous material with at least one gas permeable element mounted in recesses in said surface and provided with means to feed pressurized gas to said recesses comprising simultaneously applying pressurized gas to said recesses to distort said element outwardly and machining said surface.

2. A method of machining a workpiece which is intended to be subjected to pressurized gas during operation of the device to which it is attached for operation, said workpiece being made of homogeneous material and comprising at least one element made from material permeable to pressurized gas integral therewith and mounted in a recess which opens on the face of the workpiece to be machined comprising simultaneously passing pressurized gas through said gas permeable element so as to elastically distort said element outwards and machining said face, and ending said machining when the face of said element under pressure is substantially coplanar with the corresponding face of the workpiece.

3. A method of machining according to claim 2 wherein during said machining the coefficient of permeability of the element is measured and the machining and passage of pressurized gas is stopped at the moment the flow of pressurized gas through said element corresponds to the desired coefficient of permeability.

4. A method of machining according to claim 3 wherein the pressure of said gas during machining is at least equal to the working pressure of the gas passing through the element when operationally mounted.

References Cited
UNITED STATES PATENTS

| | | |
|---|---|---|
| 1,039,016 | 9/1912 | Bohacek. |
| 2,241,478 | 5/1941 | Remington. |
| 2,781,554 | 2/1957 | Robinson. |
| 3,004,766 | 10/1961 | Bryant _____ 51—235 X |
| 3,186,271 | 6/1955 | Kaiser _____ 83—176 X |

HAROLD D. WHITEHEAD, Primary Examiner

U.S. Cl. X.R.

83—1